(12) United States Patent
Li et al.

(10) Patent No.: US 12,076,659 B2
(45) Date of Patent: Sep. 3, 2024

(54) PROGRAMMING BUILDING BLOCK

(71) Applicant: SHANGHAI BLOKS TECHNOLOGY GROUP CO. LTD, Shanghai (CN)

(72) Inventors: Bin Li, Shanghai (CN); Ye Xiao, Shanghai (CN); Qinmao Shu, Shanghai (CN); Chao Gao, Shanghai (CN); Jialiang Zhao, Shanghai (CN); Song Liu, Shanghai (CN); Chenlu Liu, Shanghai (CN)

(73) Assignee: SHANGHAI BLOKS TECHNOLOGY GROUP CO. LTD, Shanghai (CN)

( * ) Notice: Subject to any disclaimer, the term of this patent is extended or adjusted under 35 U.S.C. 154(b) by 631 days.

(21) Appl. No.: 17/417,095

(22) PCT Filed: Dec. 2, 2019

(86) PCT No.: PCT/CN2019/122309
§ 371 (c)(1),
(2) Date: Jun. 21, 2021

(87) PCT Pub. No.: WO2020/125385
PCT Pub. Date: Jun. 25, 2020

(65) Prior Publication Data
US 2022/0072441 A1 Mar. 10, 2022

(30) Foreign Application Priority Data
Dec. 21, 2018 (CN) .......................... 201811572649.5

(51) Int. Cl.
*A63F 9/24* (2006.01)
*A63H 33/04* (2006.01)
*G06F 8/34* (2018.01)

(52) U.S. Cl.
CPC ............ *A63H 33/042* (2013.01); *A63F 9/24* (2013.01); *G06F 8/34* (2013.01)

(58) Field of Classification Search
CPC ..................................... G06F 8/34; A63F 9/24
See application file for complete search history.

(56) References Cited

U.S. PATENT DOCUMENTS 10,293,268 B2 * 5/2019 Hirata ...................... A63F 13/25
10,304,353 B1 * 5/2019 Lozano .................... G06F 8/34
(Continued)

FOREIGN PATENT DOCUMENTS

CN 105435468 A 3/2016
CN 106139614 A 11/2016
(Continued)

*Primary Examiner* — David L Lewis
*Assistant Examiner* — Shauna-Kay Hall
(74) *Attorney, Agent, or Firm* — Bayramoglu Law Offices LLC

(57) ABSTRACT

A programming building block includes an instruction reading building block and an instruction building block. The instruction reading building block reads command instructions in the instruction building block. The command instructions include an instruction for setting a mode, an instruction for setting a behavior in the mode, an instruction for setting a behavior, or an upgrade instruction. A priority is set between the plurality of instructions for setting the mode. Compared with the prior art, the present invention has the advantage that programming can be performed without an electronic display device.

15 Claims, 3 Drawing Sheets

(56) References Cited

U.S. PATENT DOCUMENTS

| | | | | |
|---|---|---|---|---|
| 11,014,014 | B2* | 5/2021 | Muthyala | A63H 33/042 |
| 11,282,409 | B2* | 3/2022 | Nagasaka | G09B 19/0053 |
| 2005/0026537 | A1 | 2/2005 | Hsieh et al. | |
| 2006/0172787 | A1* | 8/2006 | Ellis | A63F 13/31 |
| | | | | 463/41 |
| 2013/0302763 | A1* | 11/2013 | Edwards | G09B 1/36 |
| | | | | 434/362 |
| 2014/0127965 | A1* | 5/2014 | Adam | A63H 33/042 |
| | | | | 446/91 |
| 2017/0144083 | A1 | 5/2017 | Kaersgaard et al. | |
| 2019/0094841 | A1* | 3/2019 | Denayer | G05B 19/41805 |

FOREIGN PATENT DOCUMENTS

| | | |
|---|---|---|
| CN | 106924977 A | 7/2017 |
| CN | 107065604 A | 8/2017 |
| CN | 207233254 U | 4/2018 |
| CN | 108310781 A | 7/2018 |
| CN | 207694266 U | 8/2018 |
| CN | 108525325 A | 9/2018 |
| CN | 108766118 A | 11/2018 |
| JP | 2017517030 A | 6/2017 |
| JP | 2017121283 A | 7/2017 |
| KR | 20180133162 A | 12/2018 |
| WO | 2017014530 A1 | 1/2017 |

\* cited by examiner

PROGRAMMING BUILDING BLOCK

CROSS REFERENCE TO THE RELATED APPLICATIONS

This application is the national phase entry of International Application No. PCT/CN2019/122309, filed on Dec. 2, 2019, which is based upon and claims priority to Chinese Patent Application No. 201811572649.5, filed on Dec. 21, 2018, the entire contents of which are incorporated herein by reference.

TECHNICAL FIELD

The present invention relates to the field of toy building blocks, and in particular to a programming building block.

BACKGROUND

In the evolution of programming modes, the earliest mode for programming was to write codes directly in various programming languages, and later graphical programming was developed. Graphical programming uses the arrangement and nesting of graphic elements to form algorithmic logic, and generates the final code according to the algorithmic logic based on the code corresponding to each graphic.

Graphical programming has been applied in the field of electronic building blocks, as being visually intuitive and easy to program. For example, graphical programming is performed on a tablet computer to obtain a control code, and then the control code is sent to a master control unit, which controls an execution unit to execute actions according to the control code. In this process, display devices such as tablet computers are essential for the need of graphical representation, but long-term programming will negatively affect the visual health of children and teenagers.

SUMMARY

In view of the shortcomings in the prior art, an objective of the present invention is to provide a programming building block.

A programming building block provided according to the present invention includes an instruction reading building block and an instruction building block.

Preferably, the instruction reading building block reads command instructions indicated by the instruction building block. The command instructions include an instruction for setting a mode, an instruction for setting a behavior in the mode, and an instruction for setting a behavior or an upgrade instruction. A priority is set between the plurality of instructions for setting the mode.

A housing of the instruction building block is a splicing body, a card-like body or a plate-like body.

The command instructions are programs, data, circuit parameters or mechanical triggers.

The programs are transmitted in a wired mode or a wireless mode, and the programs are stored in a volatile mode or a non-volatile mode.

The circuit parameters include resistance, photosensitivity or piezoelectric parameters.

Preferably, the instruction reading building block includes an instruction reading building block housing, a controller, and a reading circuit. The controller is located inside the instruction reading building block housing and electrically connected to the reading circuit. Reading areas of the reading circuit are located at a surface position of the instruction reading building block housing. The controller reads an electrical signal at the reading areas to obtain reading signals, and outputs instruction signals according to the reading signals.

The instruction building block includes an instruction building block housing and an instruction circuit. To-be-read areas of the instruction circuit are located at a surface position of the instruction building block housing.

The controller of the instruction reading building block reads the electrical signal of the instruction circuit of the instruction building block at the reading areas through coupling between the reading areas and the to-be-read areas. The coupling includes any one or more modes of electrical coupling, optical coupling, and magnetic coupling.

Preferably, the instruction reading building block includes an output circuit, and the controller is connected to the output circuit.

An output area of the output circuit is located at a surface position of the instruction reading building block housing, or the output area of the output circuit is located at an internal position of the instruction reading building block housing. The controller outputs the instruction signals through the output area of the output circuit.

The output circuit adopts a wired output mode or a wireless output mode;

At least one reading circuit and the output circuit are an identical circuit, or the reading circuit and the output circuit are different circuits.

The instruction reading building block includes a switch unit. After the instruction building block is plugged in, the switch unit is triggered, and the instruction reading building block reads the electrical signal at the reading areas.

Preferably, the controller determines an output time sequence of the instruction signals corresponding to the plurality of reading areas according to a positional relationship or a logical relationship between the plurality of reading areas.

Preferably, at least one instruction information is obtained by the controller according to the plurality of reading signals.

Preferably, the plurality of reading signals are read from one reading area or from one or more reading areas.

Preferably, at least one read information is configured for indicating the output time sequence of the instruction signals.

Preferably, the electrical coupling adopts a wired mode, the reading areas and the to-be-read areas are matched connectors, and the reading circuit is wired to the instruction circuit when the reading areas are mated with the to-be-read areas.

Preferably, the electrical coupling adopts a wireless mode, the reading areas and the to-be-read areas constitute a signal transmission channel, and the reading circuit reads the electrical signal emitted by the instruction circuit through the signal transmission channel.

Preferably, the instruction reading building block includes a prompt device.

The prompt device indicates a coupling state between the reading areas and the to-be-read areas.

The instruction building block housing includes a light observation channel.

When the electrical coupling is formed between the reading areas and the to-be-read areas, light emitted by the prompt device can exit through the light observation channel.

Preferably, the reading area of the reading circuit includes at least one set of first-type circuit contact connectors.

The to-be-read area of the instruction circuit includes at least one set of second-type circuit contact connectors.

The instruction reading building block housing includes at least one set of first-type building block connectors.

The instruction building block housing includes at least one set of second-type building block connectors.

When the first-type building block connectors are adaptively connected to the second-type building block connectors, the first-type circuit contact connectors are adaptively connected to the second-type circuit contact connectors to form a conductive path.

Preferably, one or more sets of first-type circuit contact connectors are correspondingly and fixedly provided on a set of first-type building block connectors; and one or more sets of second-type circuit contact connectors are correspondingly and fixedly provided on a set of second-type building block connectors.

Preferably, the first-type circuit contact connector includes a power connector and/or a signal interface; and the second-type circuit contact connector includes a power connector and/or a signal interface.

Preferably, when the electrical coupling is formed between the reading areas and the to-be-read areas, a plurality of first-type circuit contact connectors in the same set are connected through the corresponding set of second-type circuit contact connectors to form a loop, and the loop is further connected to the controller and the instruction circuit.

The controller reads circuit parameters of the instruction circuit as the reading signals through the loop.

Preferably, a physical parameter sequence of a plurality of sets of first-type building block connectors corresponding to the reading areas indicates a reading sequence or an execution sequence of the instruction signals.

The physical parameter sequence is configured in the controller, or the physical parameter sequence is indicated to the controller through a signal parameter sequence generated by an adjusting circuit.

The signal parameter sequence generated by the adjusting circuit includes:

a time sequence generated by a delay circuit; or a sequence of an amplitude magnitude, a frequency magnitude or a phase magnitude caused by a modulator.

Preferably, the controller includes a master control circuit, and the master control circuit mainly adopts a chip MC32F7343.

The master control circuit performs control on the reading circuit, and the control includes a reading time, a reading sequence, and a switch of a reading function.

The master control circuit controls the prompt device. The prompt device includes a plurality of position indicator lights LED corresponding to a plurality of plug-in positions of the instruction building block, respectively, and prompts whether the instruction building block is plugged to be electrically connected. The prompt device further includes a power indicator Power_LED, which is controlled by the control circuit to indicate whether the instruction reading building block has been powered on to be in a working state.

The master control circuit provides a clock signal and a data signal.

Preferably, the instruction circuit in the instruction building block is configured for outputting command instructions. The command instruction is a data frame instruction mainly composed of data signals, or an instruction such as a pulse signal mainly composed of high-level and low-level signals, or transmits an optical signal instruction through an optocoupler peripheral circuit such as a light emitting diode or an infrared emitter.

Preferably, the instruction circuit is one or more discrete components, and is configured to change the resistance or voltage drop of the loop after being connected to the loop.

Preferably, the reading circuit has a clock signal pin and further has a data signal pin or a voltage signal pin. Through the data signal pin, data from the instruction circuit are obtained to obtain the command instructions. A change in the voltage value after the instruction circuit is connected is obtained through the voltage signal pin.

Preferably, the instruction reading building block has a structure configured for assisting in triggering and indicating the command instructions, including a piezoelectric circuit or a switching circuit.

Compared with the prior art, the present invention has the following advantages.

Programming can be performed without an electronic display device.

BRIEF DESCRIPTION OF THE DRAWINGS

Other features, objectives and advantages of the present invention will become more apparent from reading the detailed description of non-restrictive embodiments with reference to the drawings.

DETAILED DESCRIPTION OF THE EMBODIMENTS

Figure 1:
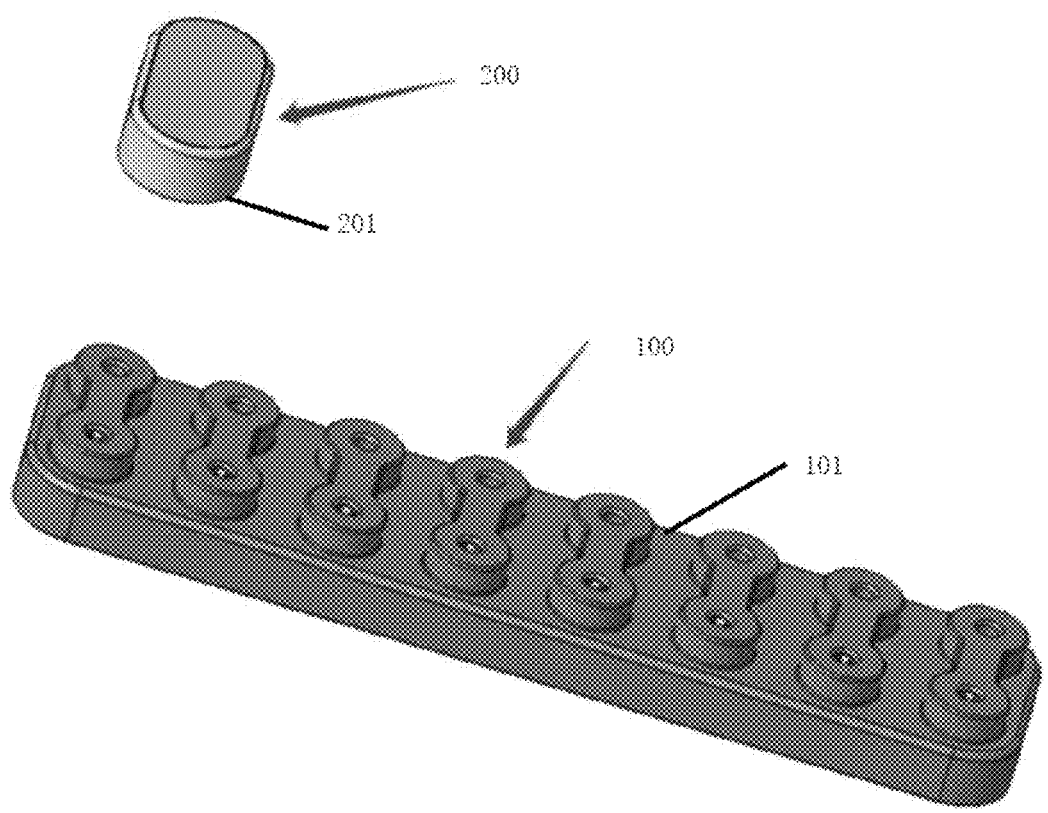
FIG. 1 is a structural schematic diagram of the present invention.

The present invention is described in detail below in conjunction with the specific embodiments. The following embodiments help those skilled in the art further understand the present invention, but do not limit the present invention in any form. It should be noted that those ordinarily skilled in the art can make several changes and modifications without departing from the concept of the present invention. These changes and modifications shall fall within the scope of protection of the present invention.

A programming building block provided according to the present invention includes the instruction reading building block 100 and the instruction building block 200.

The instruction reading building block 100 is a connection building block, reads an instruction from the instruction building block 200 and outputs the instruction to other building blocks, such as a master control building block or an execution building block. The instruction reading building block 100 itself can be the master control building block or the execution building block.

When reading a plurality of instructions from a plurality of instruction building blocks 200, the master control building block executes these instructions sequentially, or obtains a new instruction according to operations of the plurality of instructions and then executes the new instruction.

One instruction reading building block 100 can be read by another instruction reading building block 100, wherein the one instruction reading building block 100 constitutes the instruction building block 200 with respect to the another instruction reading building block 100.

The instruction reading building block 100 reads command instructions indicated by the instruction building block 200. The command instructions include an instruction for setting a mode, an instruction for setting a behavior in the mode, an instruction for setting a behavior or an upgrade instruction. A priority is set between the plurality of instructions for setting the mode.

The command instructions are stored in the instruction building block 200 in advance, or generated by the instruction building block 200 in real time, or the instruction building block triggers the instruction reading building block 100 to obtain the instructions stored locally, or the instruction building block triggers the instruction reading building block 100 to generate the instructions locally in real time.

The mode is a master control building block mode or an instruction reading building block mode. For example, the instruction reading building block has different instruction reading sequences or instruction output sequences in different modes.

For example, one mode is a stop mode that has the highest priority.

Instructions of the same behavior indicate an execution unit to execute different behaviors in different modes.

The housing of the instruction building block 200 is a splicing body, a card-like body or a plate-like body.

The instruction building blocks 200 are connected in series, in parallel or in series and parallel.

The instruction building blocks 200 can be plugged in and stacked to each other. The splicing bodies can be plugged in and connected to each other.

The card-like body is, for example, a card.

The plate-like body is, for example, a programming board.

The command instructions are programs, data, circuit parameters or mechanical triggers.

The programs are transmitted in a wired mode and a wireless mode. The programs are stored in a volatile mode or a non-volatile mode.

The circuit parameters include resistance, photosensitivity or piezoelectric parameters.

The instruction reading building block 100 includes the instruction reading building block housing 101, a controller, and a reading circuit. The controller is located inside the instruction reading building block housing 101 and electrically connected to the reading circuit. Reading areas of the reading circuit are located at a surface position of the instruction reading building block housing 101. The controller reads an electrical signal at the reading areas to obtain reading signals, and outputs instruction signals according to the reading signals.

The instruction building block 200 includes the instruction building block housing 201 and an instruction circuit. To-be-read areas of the instruction circuit are located at a surface position of the instruction building block housing 201. The controller of the instruction reading building block 100 reads the electrical signal of the instruction circuit of the instruction building block 200 at the reading areas through the coupling between the reading areas and the to-be-read areas. The coupling includes any one or more modes of electrical coupling, optical coupling, and magnetic coupling. Preferably, the instruction reading building block 100 includes an output circuit. The controller is connected to the output circuit. An output area of the output circuit is located at a surface position of the instruction reading building block housing 101, or the output area of the output circuit is located at an internal position of the instruction reading building block housing 101. The controller outputs the instruction signals through the output area of the output circuit.

The output circuit adopts a wired output mode or a wireless output mode. At least one reading circuit and the output circuit are an identical circuit, or the reading circuit and the output circuit are different circuits. The instruction reading building block includes a switch unit. After the instruction building block is plugged in, the switch unit is triggered, and the instruction reading building block reads the electrical signal at the reading areas. The controller determines an output time sequence of the instruction signals corresponding to the plurality of reading areas according to a positional relationship or a logical relationship between the plurality of reading areas. At least one instruction information is obtained by the controller according to one or more reading signals. The plurality of reading signals are read from one reading area or from a plurality of reading areas. At least one read information is configured for indicating the output time sequence of the instruction signals. When the electrical coupling adopts a wired mode, the reading areas and the to-be-read areas are matched connectors, and the reading circuit is wired to the instruction circuit when the reading areas are mated with the to-be-read areas. When the electrical coupling adopts a wireless mode, the reading areas and the to-be-read areas constitute a signal transmission channel, and the reading circuit reads the electrical signal emitted by the instruction circuit through the signal transmission channel.

The instruction reading building block 100 includes a prompt device. The prompt device indicates a coupling state between the reading areas and the to-be-read areas. The instruction building block housing 201 includes a light observation channel. When the electrical coupling is formed between the reading areas and the to-be-read areas, light emitted by the prompt device can exit through the light observation channel.

The reading area of the reading circuit includes at least one set of first-type circuit contact connectors.

The to-be-read area of the instruction circuit includes at least one set of second-type circuit contact connectors.

The instruction reading building block housing 101 includes at least one set of first-type building block connectors.

The instruction building block housing 201 includes at least one set of second-type building block connectors.

When the first-type building block connectors are adaptively connected to the second-type building block connectors, the first-type circuit contact connectors are adaptively connected to the second-type circuit contact connectors to form a conductive path.

One or more sets of first-type circuit contact connectors are correspondingly and fixedly provided on a set of first-type building block connectors.

One or more sets of second-type circuit contact connectors are correspondingly and fixedly provided on a set of second-type building block connectors.

The first-type circuit contact connector includes a power connector and/or a signal interface.

The second-type circuit contact connector includes a power connector and/or a signal interface.

Preferably, when the electrical coupling is formed between the reading areas and the to-be-read areas, a plurality of first-type circuit contact connectors in the same set are connected through the corresponding set of second-type circuit contact connectors to form a loop, and the loop is further connected to the controller and the instruction circuit. The controller reads circuit parameters of the instruction circuit as the reading signals through the loop. A physical parameter sequence of a plurality of sets of first-type building block connectors corresponding to the reading areas indicates a reading sequence or an execution sequence of the instruction signals. The physical parameter sequence is configured in the controller, or the physical parameter sequence is indicated to the controller through a signal parameter sequence generated by an adjusting circuit. The signal parameter sequence generated by the adjusting circuit includes: a time sequence generated by a delay circuit, or the sequence of an amplitude magnitude, a frequency magnitude or a phase magnitude caused by a modulator.

TP1 to TP16 in the figures are test points, or correspond to or are connected to a circuit contact connector in a preferred or variant example. When the instruction building block and the instruction reading building block are plugged in, chips, resistors, transistors and other components in the figures are connected through the corresponding TP terminals.

Figure 2:
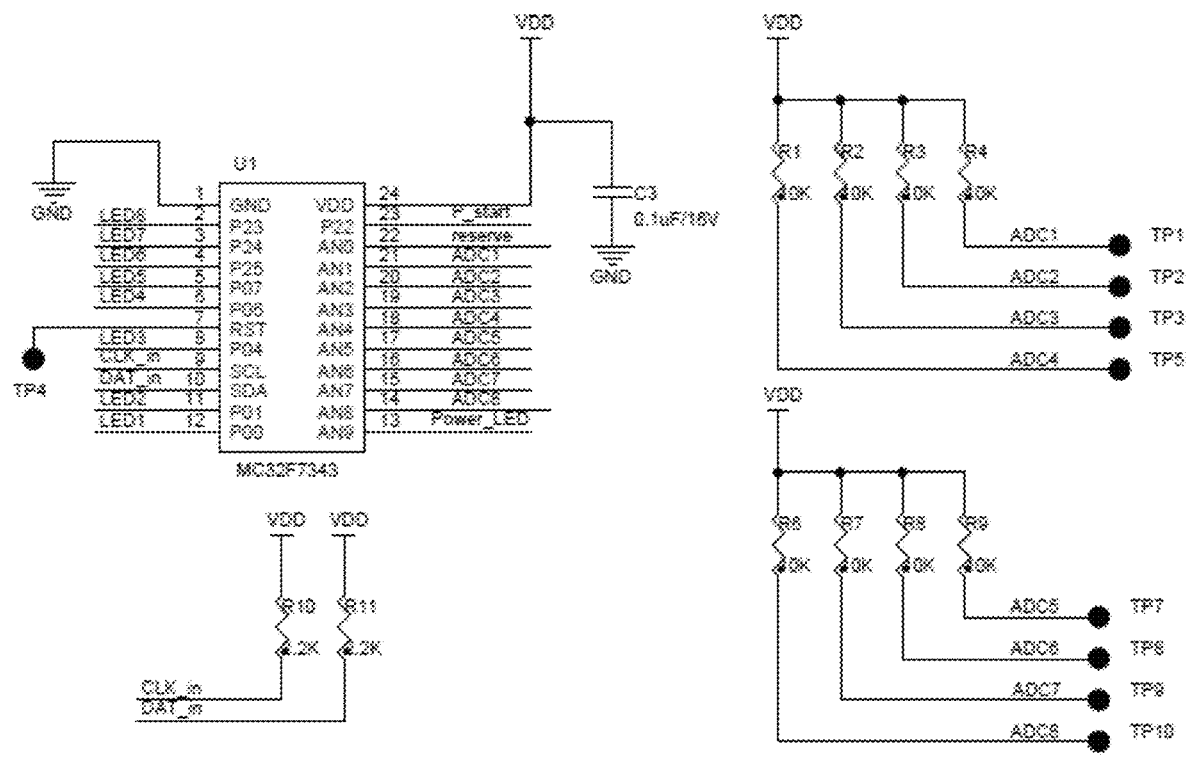
FIG. 2 is a circuit diagram of a master control circuit containing a controller suitable for parallel programming in an instruction reading building block.

FIG. 2 shows a circuit diagram of the present invention. The circuit diagram mainly shows a master control circuit. The master control circuit is a preferred implementation of the controller and its peripheral circuits. The master control circuit mainly adopts a chip MC32F7343 to control the circuits in the instruction reading building block 100 or other circuits in the instruction reading building block 100. For example, the reading circuit is controlled in terms of the reading time, the reading sequence, the switch of the reading function, and so on. For another example, the prompt device, which includes LED1 to LED8 corresponding to eight plug-in positions of the instruction reading building block 100 shown in FIG. 1, respectively, is controlled to prompt whether the instruction building block is plugged in to be electrically connected. The prompt device further includes Power_LED, which is controlled by the control circuit to indicate whether the instruction reading building block 100 has been powered on to be in a working state. In addition, the chip MC32F7343 provides a clock signal CLK_in and a data signal DAT_in.

Figure 3:
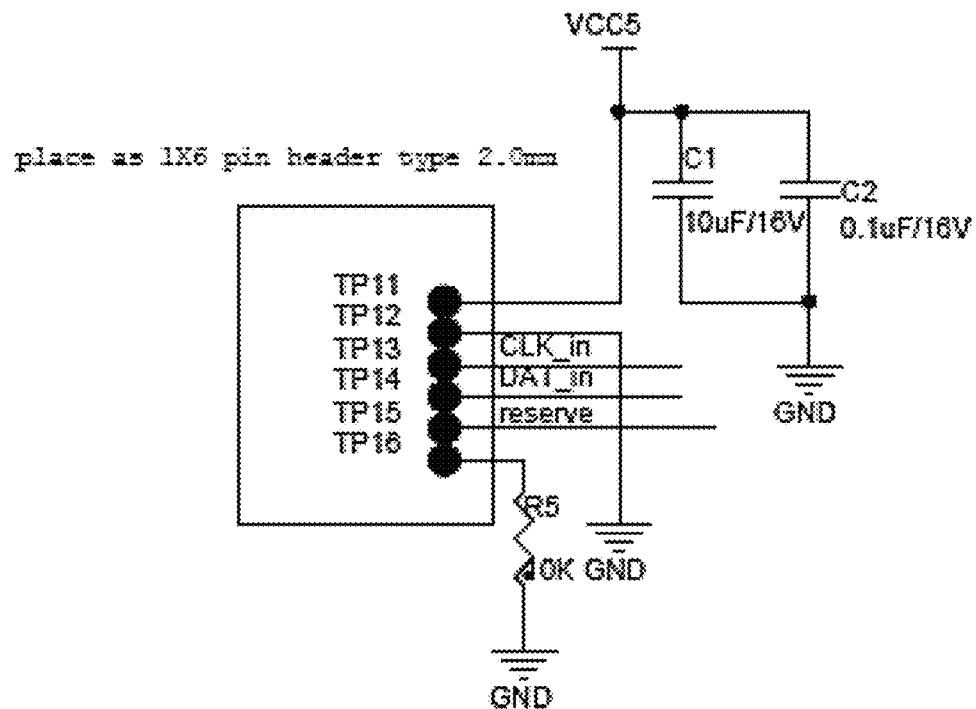
FIG. 3 shows an interface circuit of the master control circuit containing a reading circuit suitable for parallel programming in the instruction reading building block.

FIG. 3 shows an interface circuit of the master control circuit, wherein the interface circuit includes an interface CLK_in providing a clock signal and an interface DAT_in providing a data signal. The interface circuit is connected to other circuits or used as a test interface. For example, the interface circuit is connected to the instruction circuit in the instruction building block 200 to realize the interfacing communication of the clock signal and the data signal.

Figure 4:
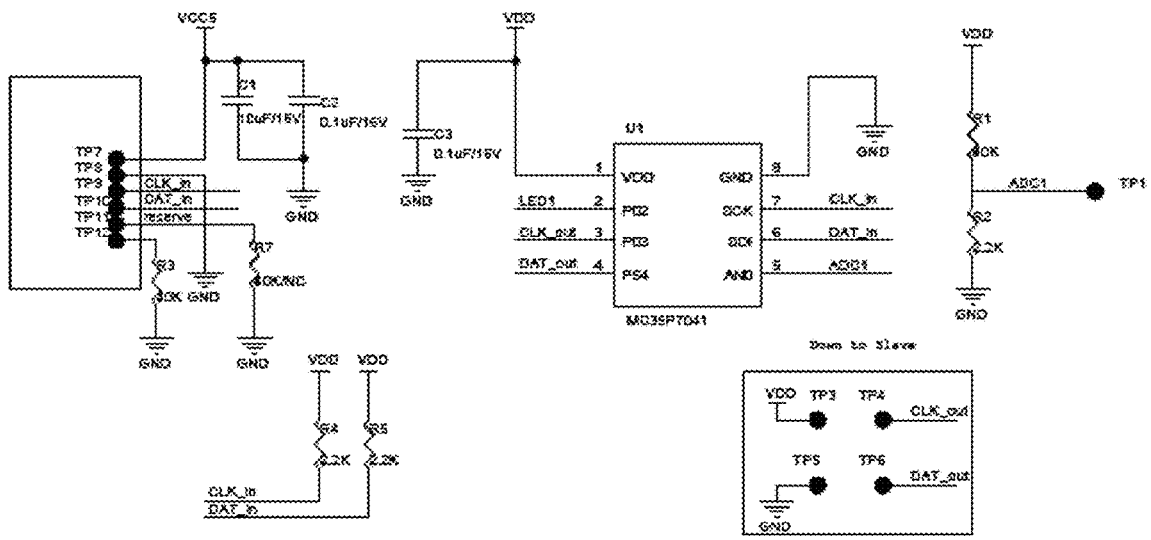
FIG. 4 is a circuit diagram of the master control circuit suitable for serial programming, where the circuit can be applied to the instruction reading building block in a preferred embodiment, and optionally, can also be applied to other building blocks.

FIG. 4 shows another circuit diagram of the present invention, which can be interpreted as a variation of the circuit diagram shown in FIG. 2. In FIG. 2, the relationship between the programming instructions contained in the plurality of instruction building blocks 200 is a parallel execution relationship. In FIG. 4, the relationship between the programming instructions contained in the plurality of instruction building blocks 200 is a serial execution relationship.

The circuit diagram in FIG. 4 mainly shows the master control circuit. The master control circuit is a preferred implementation of the controller and its peripheral circuits. The master control circuit mainly adopts a chip MC35P7041. The chip MC35P7041 has clock signal pins CLK_in and CLK_out and further has data signal pins DAT_in and DAT_out. The chip MC35P7041 can control circuits in the instruction reading building block 100 or other circuits in the instruction reading building block 100. For example, the reading circuit is controlled in terms of the reading time, the reading sequence, the switch of the reading function, and so on. In addition, the chip MC35P7041 provides the clock signal CLK_in and the data signal DAT_in.

Figure 5:
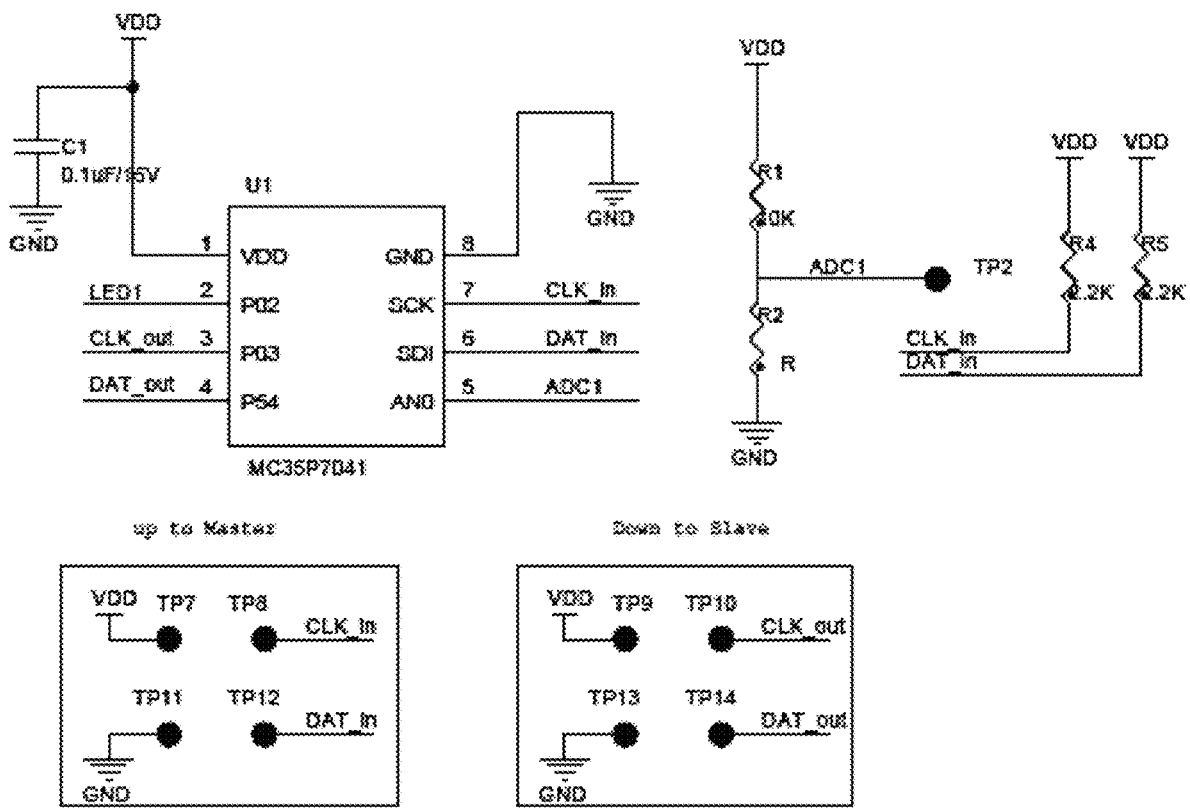
FIG. 5 shows a circuit diagram and interface circuit of a serial plug-in programming module, where the circuit can be applied to the instruction reading building block in a preferred embodiment, and optionally, can also be applied to other building blocks.

The circuit shown in FIG. 5 mainly adopts a chip MC35P7041. The circuit, for example, can be applied to the instruction reading building block 100, and optionally, can also be applied to other building blocks. With the chip MC35P7041, the circuit can output and/or receive command instructions. The command instruction is a data frame instruction mainly composed of data signals, or an instruction such as a pulse signal mainly composed of high-level and low-level signals, or transmits an optical signal instruction through an optocoupler peripheral circuit such as a light emitting diode or an infrared emitter.

The instruction circuit is constructed according to actual needs. For example, the instruction circuit is one or more components such as a resistor, capacitor, or transistor, to change the resistance or voltage drop.

Through the illustration of the above circuit diagrams, the instruction storage, instruction transmission, instruction receiving, instruction processing and the like in the instruction reading building block 100 are implemented by the corresponding chips. Further, those skilled in the art can add corresponding peripheral circuits according to actual needs, such as a current limiting protection circuit mainly composed of resistors, a communication circuit containing a wireless communication chip, and the like.

Those skilled in the art can implement the peripheral circuits of each chip in the above circuit diagrams according to actual needs with reference to the datasheet of the chip, which will not be repeated herein.

Further, when the instruction building block 200 triggers and indicates the command instructions mechanically, there may be no circuit in the instruction building block 200. Accordingly, the instruction reading building block 100 has a structure configured for assisting in triggering and indicating the command instructions, such as a piezoelectric circuit and a switch circuit.

The specific embodiments of the present invention have been described above. It should be understood that the present invention is not limited to the above particular embodiments and that various changes or modifications can be made by those skilled in the art within the scope of the claims without affecting the substantial contents of the present invention. Embodiments and features in the embodiments of the present invention can be arbitrarily combined with each other when not in conflict.

What is claimed is:

1. A programming building block, comprising:
an instruction reading building block; and
an instruction building block;
wherein
the instruction reading building block reads command instructions indicated by the instruction building block, and the command instructions comprise a plurality of instructions for setting a first mode, an instruction for setting a first behavior in a second mode, an instruction for setting a second behavior, or an upgrade instruction;
a priority is set between the plurality of instructions for setting the first mode;
a housing of the instruction building block is a splicing body, a card-like body or a plate-like body;
the command instructions are programs, data, circuit parameters or mechanical triggers;
the programs are transmitted in a wired mode or a wireless mode;
the programs are stored in a volatile mode or a non-volatile mode; and
the circuit parameters comprise resistance parameters, photosensitivity parameters or piezoelectric parameters.

2. A programming building block, comprising:
an instruction reading building block; and
an instruction building block;
wherein
the instruction reading building block comprises an instruction reading building block housing, a controller, and a reading circuit;
the controller is located inside the instruction reading building block housing and the controller is electrically connected to the reading circuit;
a plurality of reading areas of the reading circuit are located at a first surface position of the instruction reading building block housing;
the controller reads an electrical signal at the plurality of reading areas to obtain reading signals, and the controller outputs instruction signals according to the reading signals;
the instruction building block comprises an instruction building block housing and an instruction circuit;
a plurality of to-be-read areas of the instruction circuit are located at a surface position of the instruction building block housing; and
the controller of the instruction reading building block reads the electrical signal of the instruction building block at the plurality of reading areas through a coupling between the plurality of reading areas and the plurality of to-be-read areas, wherein the coupling comprises at least one of electrical coupling, optical coupling, and magnetic coupling.

3. The programming building block as claimed in claim 2, wherein
the instruction reading building block comprises an output circuit;
the controller is connected to the output circuit;
an output area of the output circuit is located at a second surface position of the instruction reading building block housing, or the output area of the output circuit is located at an internal position of the instruction reading building block housing;
the controller outputs the instruction signals through the output area of the output circuit;
the output circuit adopts a wired output mode or a wireless output mode;
at least one reading circuit and the output circuit are an identical circuit, or the reading circuit and the output circuit are different circuits;
the instruction reading building block comprises a switch unit, and
after the instruction building block is plugged in, the switch unit is triggered, and the instruction reading building block reads the electrical signal at the plurality of reading areas.

4. The programming building block as claimed in claim 2, wherein
the controller determines an output time sequence of the instruction signals corresponding to the plurality of reading areas according to a positional relationship or a logical relationship between the plurality of reading areas.

5. The programming building block as claimed in claim 2, wherein
at least one instruction information is obtained by the controller according to the reading signals.

6. The programming building block as claimed in claim 5, wherein
the reading signals are read from at least one of the plurality of reading areas.

7. The programming building block as claimed in claim 2, wherein
the electrical coupling adopts a wired mode, the plurality of reading areas and the plurality of to-be-read areas are matched connectors; and
the reading circuit is wired to the instruction circuit when the plurality of reading areas are mated with the plurality of to-be-read areas.

8. The programming building block as claimed in claim 2, wherein
the electrical coupling adopts a wireless mode, the plurality of reading areas and the plurality of to-be-read areas constitute a signal transmission channel, and
the reading circuit reads the electrical signal emitted by the instruction circuit through the signal transmission channel.

9. The programming building block as claimed in claim 2, wherein
the instruction reading building block comprises a prompt device;
the prompt device indicates a coupling state between the plurality of reading areas and the plurality of to-be-read areas;
the instruction building block housing comprises a light observation channel; and
when the electrical coupling is formed between the plurality of reading areas and the plurality of to-be-read areas, a light emitted by the prompt device exits through the light observation channel.

10. The programming building block as claimed in claim 2, wherein
each of the plurality of reading areas of the reading circuit comprises at least one set of first-type circuit contact connectors;
each of the plurality of to-be-read areas of the instruction circuit comprises at least one set of second-type circuit contact connectors;
the instruction reading building block housing comprises at least one set of first-type building block connectors;
the instruction building block housing comprises at least one set of second-type building block connectors; and when the at least one set of first-type building block connectors are adaptively connected to the at least one set of second-type building block connectors, the at least one set of first-type circuit contact connectors are adaptively connected to the at least one set of second-type circuit contact connectors to form a conductive path.

11. The programming building block as claimed in claim 10, wherein
the at least one set of first-type circuit contact connectors are correspondingly and fixedly provided on the at least one set of first-type building block connectors; and
the at least one set of second-type circuit contact connectors are correspondingly and fixedly provided on the at least one set of second-type building block connectors.

12. The programming building block as claimed in claim 10, wherein
each of the at least one set of first-type circuit contact connectors comprises a first power connector and/or a first signal interface; and
each of the at least one set of second-type circuit contact connectors comprises a second power connector and/or a second signal interface.

13. The programming building block as claimed in claim 10, wherein
when the electrical coupling is formed between the plurality of reading areas and the plurality of to-be-read areas, the at least one set of first-type circuit contact connectors are connected through the at least one set of second-type circuit contact connectors to form a loop, and the loop is further connected to the controller and the instruction circuit; and
the controller reads circuit parameters of the instruction circuit as the reading signals through the loop.

14. The programming building block as claimed in claim 2, wherein
a physical parameter sequence of the at least one set of first-type building block connectors corresponding to the plurality of reading areas indicates a reading sequence or an execution sequence of the instruction signals;
the physical parameter sequence is configured in the controller, or the physical parameter sequence is indicated to the controller through a signal parameter sequence generated by an adjusting circuit; and
the signal parameter sequence generated by the adjusting circuit comprises:
a time sequence generated by a delay circuit; or
a sequence of an amplitude magnitude, a frequency magnitude or a phase magnitude, wherein the amplitude magnitude, the frequency magnitude or the phase magnitude are caused by a modulator.

15. A programming building block, comprising:
an instruction reading building block; and
an instruction building block;
wherein
at least one read information is configured for indicating an output time sequence of instruction signals.

* * * * *